United States Patent Office 3,650,917
Patented Mar. 21, 1972

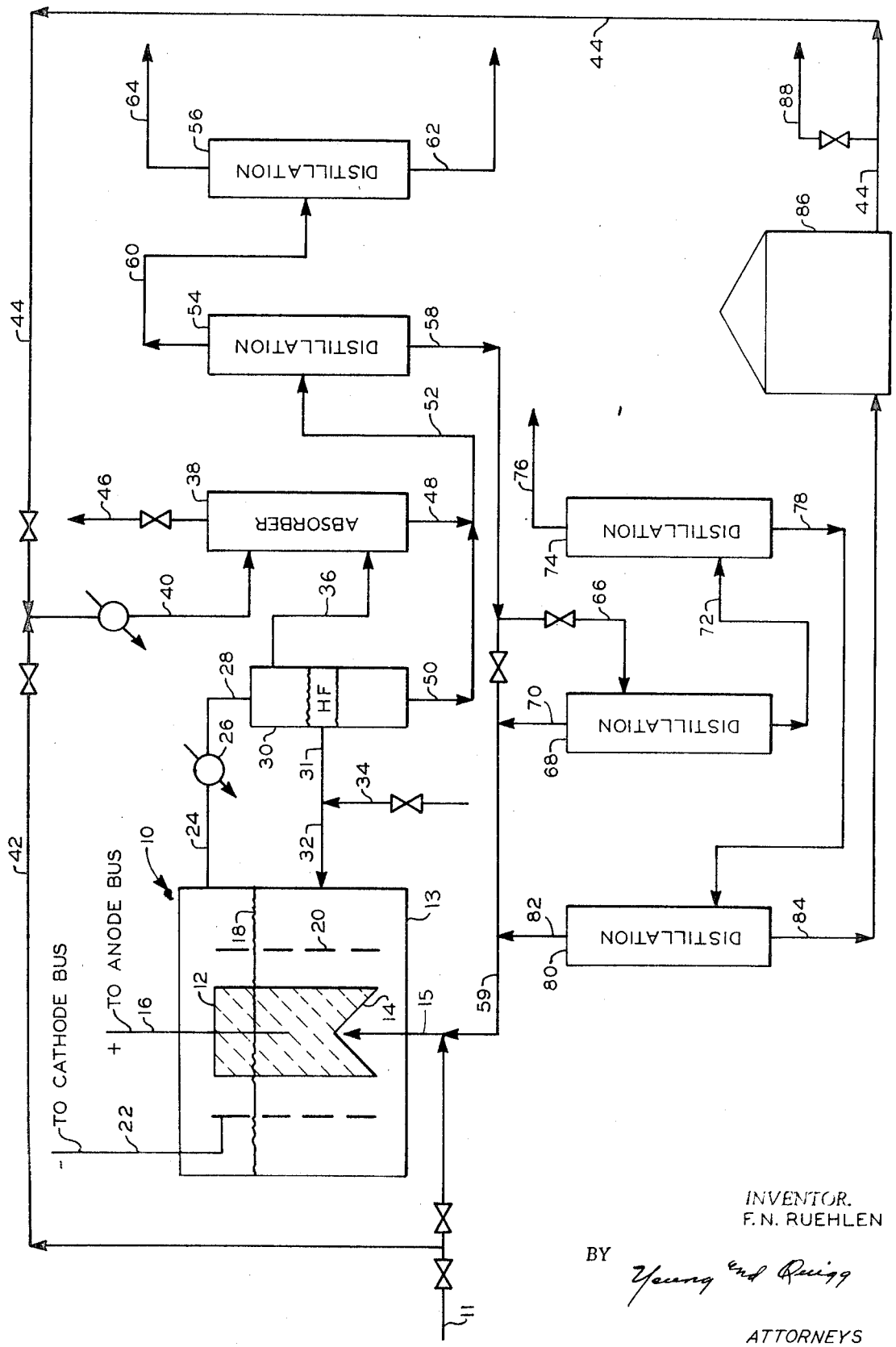

3,650,917
RECOVERY OF PRODUCTS FROM ELECTRO-
CHEMICAL FLUORINATION
Forrest N. Ruehlen, Bartlesville, Okla., assignor to
Phillips Petroleum Company
Filed Aug. 25, 1969, Ser. No. 852,601
Int. Cl. B01k 3/00
U.S. Cl. 204—59                                    13 Claims

ABSTRACT OF THE DISCLOSURE

Fluorinated products are recovered from an effluent stream from an electrolytic cell in an electrochemical fluorination process by employing a combination of steps comprising cooling said effluent stream to a temperature sufficient to condense hydrogen fluoride and higher boiling cell products contained in said effluent stream, contacting the noncondensed portion of said cooled effluent stream with an absorbent selected from the group consisting of (a) the fluorinatable feedstock to the electrolytic cell, (b) a high boiling by-product fraction produced as a by-product in the fluorination reaction, and (c) mixtures of said (a) and said (b), and recovering fluorinated products from the resulting rich absorbent and the condensed portion of said cooled effluent stream.

---

This invention relates to electrochemical fluorination. In one aspect the invention relates to the recovery of fluorinated products in an electrochemical fluorination process.

Electrochemical fluorination processes for preparing or converting a wide variety of feedstocks into desirable fluorinated products are well known in the art. Generally speaking, these processes usually involve immersing an electrode element in an electrolyte and passing an electric current through said electrolyte between said electrode and an oppositely charged element, e.g., either another electrode immersed in said electrolyte or the cell body which can serve as said other element or electrode. In recent years electrochemical fluorination processes have been developed wherein porous anode elements are employed. In one process employing a porous anode element a feedstock to be converted is passed through the porous anode into the main body of the electrolyte.

Recently it has been discovered that the reaction in an electrochemical fluorination process can be carried out within the confines, e.g., within the pores, of the porous anode itself. This type of operation is of particular utility with many feedstocks because it provides or makes possible a simple one-step route, at relatively high conversions, to produce partially fluorinated products which had previously been difficult to obtain. This process also allows operation at high conversions without substantial formation of cleavage products which are generally produced by the older methods when operating at high conversions. The feedstock to be fluorinated can be introduced into the pores of the porous anode at a point near its bottom and the fluorinated mixture removed from said pores at the top of the anode, generally above the electrolyte level. Passage of the feedstock into the bulk of the electrolyte is thus avoided.

One problem which is common to all of the above-described electrochemical fluorination processes is the recovery of the fluorinated products from the cell effluent stream. In many instances when electrolyte comprising a current-conducting hydrogen fluoride is employed, said cell effluent will usually contain hydrogen which is produced as a cathode product, some hydrogen fluoride which vaporizes from the electrolyte, various fluorinated products produced from the feedstock, and unreacted feedstock. Generally speaking, in most instances said fluorinated products will include light-ends comprising fluorinated products which are lower boiling than the feedstock, the desired fluorinated product or products, and a small amount of a fluorinated high boiling by-product. Separation of the hydrogen and hydrogen fluoride from the cell effluent without loss of the light-ends fluorinated products is particularly troublesome.

The present invention provides a solution for the above-described problems. It has now been discovered that hydrogen fluoride and hydrogen can be efficiently separated from the light-ends fluorinated products and other fluorinated products by a combination of steps which, broadly speaking, comprises cooling the cell effluent stream to a temperature which is sufficient to condense hydrogen fluoride and higher boiling materials contained in said effluent stream, contacting the noncondensed portion of said cell effluent stream in an absorption zone with an absorbent selected from the group consisting of (a) the fluorinatable feedstock to the cell, (b) a fluorinated high boiling by-product fraction produced in the fluorination process, and (c) mixtures of said (a) and said (b), and then recovering fluorinated products from the resulting rich absorbent and the condensed portion of said cooled effluent stream.

An object of this invention is to provide an improved electrochemical fluorination process. Another object of this invention is to provide a method for recovering fluorinated products in an electrochemical fluorination process. Another object of the invention is to provide a method for separating hydrogen, hydrogen fluoride, and fluorinated products from a cell effluent stream in an electrochemical fluorination process with minimum loss of valuable fluorinated products. Other aspects, objects, and advantages of the invention will be apparent to those skilled in the art in view of this disclosure.

Thus, according to the invention, there is provided in a process for the fluorination of a fluorinatable organic compound feedstock wherein, an electric current is passed through a current-conducting essentially anhydrous liquid hydrogen fluoride electrolyte contained in an electrolysis cell provided with a cathode and an anode, a feedstock is passed into said cell and into contact with said anode and at least partially fluorinated, and fluorinated product is recovered from an effluent stream withdrawn from said cell, the improvement comprising: passing said effluent stream to a cooling zone and therein cooling said effluent stream to a temperature sufficient to condense hydrogen fluoride and higher boiling materials contained in said effluent stream; passing said cooled effluent stream to a first separation zone and therein effecting a separation between condensed hydrogen fluoride and other condensed effluent components including fluorinated products and any unreacted feedstock; passing the noncondensed portion of said cooled effluent stream to an absorption zone and therein contacting same with an absorbent selected from the group consisting of (a) said feedstock, (b) a high boiling by-product fraction produced in said fluorination step and (c) mixtures of said (a) and (b); and recovering fluorinated products from the resulting rich absorbent and said other condensed effluent components.

A number of advantages are realized or obtained in the practice of the invention. One important advantage is that no stripping column is required to separate from the absorbent the absorbed fluorinated and/or unfluorinated products which it is desirable to recycle to the cell, because the absorbent employed is a normal component of the cell feed stream and/or the cell effluent stream. Another advantage is that said absorbent, being a normal component of the cell feed stream and/or the cell effluent stream, introduces no contaminants into said cell effluent stream. Still another advantage is that by proper control of the operating conditions in the absorption step of the invention, losses of fluorinated products can be reduced to the bare minimum, e.g., unavoidable mechanical losses. Thus, the invention provides a truly efficient method for the recovery of fluorinated products from a cell effluent stream in electrochemical fluorination processes.

The invention is applicable to any electrochemical fluorination process employing an electrolyte comprising essentially anhydrous hydrogen fluoride. The invention is particularly applicable to electrochemical fluorination processes in which porous anodes are employed. In one presently preferred process, a current-conducting, essentially anhydrous, liquid hydrogen fluoride is electrolyzed in an electrolysis cell provided with a cathode and a porous anode (preferably porous carbon), a fluorinatable feedstock is introduced into the pores of said anode and at least a portion of said feedstock is at least partially fluorinated within the pores of said anode, and fluorinated products are recovered from a cell effluent stream.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting to form fluorinated products, are presently preferred as starting materials. Generally speaking, desirable organic starting materials which can be used are those containing from 2 to 8, preferably 2 to 6, carbon atoms per molecule. However, reactants which contain less than 2 or more than 6 or 8 carbon atoms can also be used. Some general types of organic starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds.

One group of presently preferred starting materials are the normally gaseous organic compounds, and particularly the saturated and unsaturated hydrocarbons, containing from 2 to 4 carbon atoms per molecule. Normally liquid feedstocks which can be vaporized under cell operating conditions are also preferred starting materials. Some examples of these are methane, ethane, propane, butane, isobutane, ethylene, propylene, butene-2, acetylene, propyne, butyne-1, butadiene, and the like, and mixtures thereof.

One presently more preferred class of starting materials for use in the practice of the invention includes the fluorinatable, partially halogenated compounds having a boiling point higher than at least the major portion of the fluorinated products obtained therefrom. In said halogen-containing feedstocks, the halogen can be any of the halogens, chlorine, bromine, iodine, or fluorine. Preferably, the halogen is one other than fluorine. Partially chlorinated hydrocarbons have been found particularly useful. Examples of said compounds include, among others, the following: mono, di, tri, and tetrachloroethanes; monofluoro, mono, di, tri, and tetrachloroethanes; difluoro, mono, di, and trichloroethanes; trifluoro, mono, and dichloroethanes; mono, di, tri, and tetrabromoethanes; mono, di, tri, and tetradiodoethanes; etc. Thus, applicable compounds include: methyl chloride; methyl fluoride; chloroform; methylene diiodide; bromoform; chlorofluoromethane; bromochloromethane; 1,2-dichloroethane; 1,1-diiodoethane; 1-bromo-2-fluoroethane; 1,1,2-trichloroethane; 1,1-dichloro-2,2-difluoroethane; 1,2-dichloropropane; 1 - bromo - 3-iodopropane; 1-chloro-3-fluoropropene; 1,1-dichloro-2,3-difluoropropane; 1,1,1,2-tetrafluoropropane; 1,1 - dichlorobutane; 2,3 - dibromobutane; 1,1,1-trichloro-3-iodobutane; 1,4-difluorobutene-2; 1,2,3-trichlorobutane; and the like, and mixtures thereof.

The hydrogen fluoride electrolyte can contain small amounts of water, such as up to about 5 weight percent. However, it is preferred that said electrolyte be essentially anhydrous, e.g., contain not more than about 0.1 weight percent water. Commercial anhydrous liquid hydrogen fluoride containing up to about 1 percent by weight of water can be used. Thus, as used herein and in the claims, unless otherwise specified, the term "essentially anhydrous liquid hydrogen fluoride" includes liquid hydrogen fluoride which can contain water not exceeding up to about 1 percent by weight. As the electrolysis reaction proceeds, any water contained in the hydrogen fluoride electrolyte is slowly decomposed and said electrolyte concomitantly approaches the anhydrous state. Pure anhydrous liquid hydrogen fluoride is nonconductive. To provide adequate conductivity in the electrolyte, and to reduce the hydrogen fluoride vapor pressure at cell operating conditions, an inorganic additive can be incorporated in the electrolyte. Presently preferred additives for this purpose are the alkali metal fluorides and ammonium fluoride. Said additives can be utilized in any suitable molar ratio of additive to hydrogen fluoride within the range of from 1:4.5 to 1:1, preferably 1:4 to 1:2.

Generally speaking, the fluorination process can be carried out at temperatures within the range of from −80 to 500° C. at which the vapor pressure of the electrolyte is not excessive, e.g., less than 250 mm. Hg. It is preferred to operate at temperatures such that the vapor pressure of the electrolyte is less than about 50 mm. Hg. A presently preferred range of temperature is from about 60 to about 120° C.

Pressure substantially above or below atmospheric can be employed if desired, depending upon the vapor pressure of the electrolyte as discussed above. Generally speaking, the process is conveniently carried out at substantially atmospheric pressure.

Current densities within the range of 30 to 1000, or more, preferably 50 to 500, mililamps per square centimeter of anode geometric surface can be used. The voltage which is normally employed will vary depending upon the particular cell configuration employed and the current density desired. Under normal operating conditions, however, the cell voltage or potential will be less than that required to evolve or generate free or elemental fluorine. Voltages in the range of 4 to 12 volts are typical. Generally speaking, the maximum normal voltage will not exceed 20 volts per unit cell. The term "anode geometric surface" refers to the outer geometric surface area of the porous element of the anode which is exposed to the electrolyte and does not include the pore surfaces of said porous element.

Feed rates which can be employed will preferably be within the range of from 0.5 to 10 ml. per minute per square centimeter of anode geometric surface area. Since the anode can have a wide variety of geometrical shapes, which will affect the geometrical surface area, a sometimes more useful way of expressing the feed rate is in terms of anode cross-sectional area (taken perpendicular to the direction of flow). More preferably, the feed rate will be such that the feedstock is passed into the pores of the anode, and into contact with the fluorinating species therein, at a flow rate such that the inlet pressure of said feedstock into said pores is essentially less than the sum of (a) the pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of electrolyte pressure. Under these preferred flow rate conditions, there is established a pressure balance between the feedstock entering the pores of the anode from one direction and electrolyte attempting to enter the pores from another and opposing direction. Essentially all of the feedstock travels within the porous anode via the pores therein until it exits from the anode at a point above the surface of the electrolyte. Broadly speaking, the upper limit on the flow rate will be that at which "breakout" of feedstock and/or fluorinated product begins along the immersed portion of the anode. "Breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the feed rates can be within the range of from 3 to 600, preferably 12 to 240 cc. per minute per square centimeter of cross-sectional area (taken perpendicular to the direction of flow). Herein and in the claims, unless otherwise specified, for convenience the volumetric feed rates have been expressed in terms of gaseous volume calculated at standard conditions, even though the feedstock may be introduced into the porous anode in liquid state.

Referring now to the drawing, the invention will be more fully explained. In the drawing there is illustrated an electrolytic cell, denoted generally by the reference numeral 10, comprising a cell body 13 having an anode 12 disposed therein. As here illustrated, said anode comprises a cylinder of porous carbon having a cavity 14 formed in the bottom thereof. A current collector 16 is provided in intimate contact with the upper portion of said anode 12 and is connected to the anode bus of the current supply. It will be noted that the upper end of anode 12 extends above the electrolyte level 18. A circular cathode 20, which can be a screen formed of a suitable metal such as a stainless steel, surrounds said anode 12 and is connected to the cathode bus of the current supply by a suitable lead wire 22. Any suitable source of current and connections thereto can be employed in the practice of the invention. In the operation of the cell arrangement, a feedstock is introduced into the cavity portion 14 of said anode via conduit 15, travels upward through the pores of said anode, and exits from the upper end of the anode above electrolyte level 18. During passage through said anode, at least a portion of the feedstock is electrochemically fluorinated. Fluorinated products together with any remaining unconverted feedstock, and possibly some electrolyte vapors, are withdrawn from the space above the electrolyte within cell 10 via conduit 24. During the introduction of said feedstock an electric current in an amount sufficient to supply the desired operating current density at the anode is passed between the anode and the cathode.

The cell effluent stream in conduit 24 is passed into cooler or condenser 26 wherein it is cooled to a temperature which is at least sufficient to condense the hydrogen fluoride and higher boiling cell products contained therein. Generally speaking, in most instances, said condenser preferably will be operated at a temperature within the range of from −100 to 50° C., more preferably −75 to 0° C. The pressure in condenser 26 will generally be within the range of 0 to 200 p.s.i.g., preferably 0 to 50 p.s.i.g. However, it is within the scope of the invention to operate said condenser at temperatures and pressures outside said ranges so long as said temperature is sufficient to condense the hydrogen fluoride and higher boiling material contained in the cell effluent stream. Condensate and noncondensed gases from said condenser are passed via conduit 28 into a first separation zone 30 wherein phase separations are effected between condensed hydrogen fluoride and other condensed effluent compounds including fluorinated products, unreacted feedstock and noncondensed gases. The hydrogen fluoride phase is returned to cell 10 via conduit 31 and conduit 32. Make-up hydrogen fluoride can be supplied to the system via conduit 34. As here illustrated, said first separation zone comprises a vessel wherein separation between the two liquid phases and a gaseous phase is effected by gravity settling. However, it is within the scope of the invention to employ other phase separation means or methods, e.g., centrifuging.

The noncondensed portion of the cell effluent stream is passed from separation zone 30 via conduit 36 into absorption zone 38 wherein it is contacted countercurrently with an absorbent introduced via conduit 40. As described above, said absorbent can be at least a portion of the fresh fluorinatable feedstock from conduits 11 and 42, a fluorinated high boiling by-product fraction from conduit 44 as described further hereinafter, or a mixture of said two absorbents. Unabsorbed gases, principally hydrogen, are released from the absorber via conduit 46. Said absorber 38 in most instances will be operated at a temperature within the range of from −75 to 100° C., preferably within the range of from −35 to 50° C., and a pressure within the range of 0 to 200 p.s.i.g., preferably 0 to 50 p.s.i.g. Generally speaking, in most instances, the ratio of absorbent to gas employed in absorber 38 will be within the range of 10:1 to 1:1, preferably 6:1 to 3:1, mols of absorbent feed per mol of gas feed to absorber 38. However, it is within the scope of the invention to employ ratios of absorbent to gas outside of said ranges. As will be understood by those skilled in the art in view of this disclosure, the operating conditions in said absorber 38 will depend upon the composition of the stream 36 being treated, the operating conditions in cell 10, separator 30 and distillation column 54, etc. Thus, the above-described conditions are given by way of example only and are not to be taken as limiting on the invention. Said absorber 38 can comprise any suitable means for contacting the stream in conduit 36 with the absorbent from conduit 40, e.g., a packed column, a bubble tray column, etc.

The rich absorbent is withdrawn from absorber 38 via conduit 48, combined with the condensed organic effluent withdrawn from phase separator 30 via conduit 50, and the combined stream is then passed via conduit 52 into a second separation zone. As here illustrated, said second separation zone comprises distillation or fractionation columns 54 and 56. However, it is within the scope of the invention to employ less than or more than two distillation columns in said second separation zone, depending upon the separations it is desired to effect. It is also within the scope of the invention to employ separation methods other than fractional distillation in said second separation zone, e.g., extraction, crystallization, etc. However, fractional distillation is usually preferred.

In distillation column 54 a separation is effected between a first stream comprising unreacted feedstock and absorbent which is withdrawn via conduit 58, and a second stream comprising desired fluorinated products which is withdrawn via conduit 60. In those instances where at least a portion of the fresh feedstock from conduits 11, 42 and 40 is used as absorbent in absorber 38, the stream in conduit 58 will comprise primarily unreacted feedstock and a small amount of higher boiling byproduct fraction produced in the fluorination step. Fluorinated products in said second stream in conduit 60 are passed into distillation column 56 wherein a separation into desired products is made, with said products being withdrawn via conduits 62 and 64. If desired, depending upon the product desired and the composition of the streams in said conduits 62 and 64, either of said streams can be recycled to the fluorination cell.

Said stream in conduit 58 comprising unreacted feedstock is recycled via conduit 59 to conduit 15 for introduction into cell 10 as described above. Preferably, a portion of said stream in conduit 58 is passed via conduit 66 into a third separation zone, here illustrated as comprising three distillation or fractionation columns. However, as will be understood by those skilled in the art, said third separation zone can comprise less than or more than three distillation columns, depending upon the separations it is desired to effect. It is also within the scope of the invention to employ separation methods other than fractional distillation in said third separation zone, as mentioned above.

A primary purpose in employing said third separation zone is to prevent excessive buildup of higher boiling byproduct fraction in the system of the invention which is produced in small concentrations, for example, from about 0.5 to about 1.5 weight percent, on each pass through the electrolytic cell. Thus, the stream in conduit 66, in most instances when the cell feedstock is being employed as absorbent in absorber 38, will be from 1 to 20 percent of said stream in conduit 58. It is not essential to employ said third separation zone continuously in the practice of the embodiment of the invention where the cell feedstock is employed as absorbent. A certain concentration buildup of higher boiling compounds in the system can be tolerated, depending upon the feedstock charged to the cell 10. However, in most instances, it is preferred that said stream in conduit 66 be introduced into distillation column 68 wherein a separation is effected between lower boiling fluorinated products which are passed via conduit 70 into conduit 59 for recycle as described above, and higher boiling fluorinated products which are passed via conduit 72 into distillation column 74. In said distillation column 74 a separation is effected to produce a stream comprising desired secondary fluorinated product which is withdrawn to storage via conduit 76 and a stream containing the heavy or high boiling fluorinated byproduct which is withdrawn via conduit 78 and passed into distillation column 80. In said column 80 a separation is effected between fluorinated products which are suitable for recycle to cell 10 and which are withdrawn via conduit 82 and passed into said conduit 59, and the fluorinated higher boiling by-product fraction which is withdrawn via conduit 84 and passed into storage 86. As indicated above, said byproduct fraction can be used as the absorbent in absorber 38 and can be introduced thereto via conduits 44 and 40. If not so used, it is disposed of by means of conduit 88. However, when the higher boiling fluorinated products recovered in conduit 84 are employed as absorbent in absorber 38, it is necessary that all the stream in conduit 58 be passed via conduit 66 into column 68.

The composition of said fluorinated high boiling by-product fraction will depend upon the feedstock being fluorinated in electrolytic cell 10. For example, when 1,2 dichloroethane is being fluorinated, said fraction will comprise trichloroethanes, tetrachloroethanes, pentachloroethanes, and their fluorinated derivatives. In such instances said fraction will be primarily a material having three or more chlorine atoms per molecule. A small amount thereof, up to about 20 percent, will contain three or more carbon atoms per molecule. If a nonhalogenated feedstock is charged to electrolytic cell 10, said high boiling by-product fraction will consist essentially of high boiling fluorinated materials. In all instances, said high boiling by-product fraction will comprise the heavy ends or high boiling fluorinated by-products produced in small concentration in the process.

The following illustrative embodiment of the invention will serve as a further description of the invention. In this embodiment a run is carried out for the electrochemical fluorination of 1,2-dichloroethane to 1,2-dichlorotetrafluoroethane in a system embodying the essential features of the system illustrated in the drawing and using an electrolyte having an approximate composition of $KF \cdot 2HF$. Porous carbon cylinders having cavities in the bottom thereof as illustrated diagrammatically for anode 12 are employed as anodes. In this illustrative embodiment of the invention the fresh 1,2-dichloroethane feedstock is passed from conduit 11 via conduits 42 and 40 and is employed as the absorbent in absorber 38. A stream comprising unreacted feedstock and recovered fluorinated components is withdrawn from column 54 and is passed via conduits 58 and 59, together with other recycle components from conduits 70 and 82, into conduit 15 for introduction into the pores of anode 12. The conversion in electrolytic cell 10 is carried out at an electrolye temperature of 90° C., employing a current density of 275 milliamps per square centimeter of anode geometric area, and a voltage of 6 to 9 volts, D.C. Condenser 26 is operated at a temperature of about −59° C. The pressure in cell 10, condenser 26, and phase separator 30 is substantially atmospheric. Absorber 38 is operated at a temperature of 5° C. A material balance for the system is set forth in Table I below.

In another illustrative embodiment of the invention wherein the fresh 1,2-dichloroethane feedstock is introduced via conduits 11 and 15, and byproduct fraction from conduit 44 is employed as absorbent in absorber 38, the amount of 1,2-dichloroethane recycled via conduits 58 and 59 is 127.8 gram mols per hour per 100 square feet of anode surface instead of the 221.08 value shown in Table I below. A material balance for the system in this embodiment is set forth in Table II.

TABLE I

[Gram mols per hour per 100 sq. ft. of anode geometric surface]

| Stream Number | 11, 42, 40 | 15 | 24 | 31 | 34 | 32 | 46 | 52 | 58 | 62 | 64 | 66 | 70 | 72 | 76 | 82 | 84 | 59 | 88 |
|---|---|---|---|---|---|---|---|---|---|---|---|---|---|---|---|---|---|---|---|
| Component: | | | | | | | | | | | | | | | | | | | |
| $CCIF_2CCIF_2$ | | 5.90 | 82.85 | | | | | 82.85 | 5.90 | | | 0.59 | 0.59 | | | | | 5.90 | |
| $CCIF_2CCIF_2$ | | 54.13 | 54.13 | | | | | 54.13 | 54.13 | | | 5.41 | 5.41 | | | | | 54.13 | |
| $CCIF_2CH_2CI$ | | 16.04 | 16.04 | | | | | 16.04 | 16.04 | | | 1.60 | 0.34 | 1.26 | 0.93 | 0.33 | | 15.11 | |
| $CHCIFCCIF$ | | 33.17 | 33.17 | | | | | 33.17 | 33.17 | | | 3.32 | | 3.32 | | 3.32 | | 33.17 | |
| $CHCIFCH_2CI$ | | 57.36 | 57.36 | | | | | 57.36 | 57.36 | | | 5.74 | | 5.74 | | | | 57.36 | |
| $CH_2CICH_2CI$ | | 221.08 | 127.80 | | | | | 221.08 | 221.08 | | | 22.11 | | 22.11 | 22.11 | | | 221.08 | |
| $CCIF_2CF_3$ | 93.28 | | 93.28 | | | | | 3.11 | | | 3.11 | | | | | | | | |
| $CHF_2CCIF_2$ | | | | | | | 1.56 | | | 1.56 | | | | | | | | | |
| $CHCIFCHF_2$ | | 1.61 | 1.61 | | | | | 1.61 | 1.61 | | | 0.16 | 0.16 | | | | | 1.61 | |
| $CHCIFCH_2F$ | | 1.84 | 1.84 | | | | | 1.84 | 1.84 | | | 0.18 | 0.18 | | | | | 1.84 | |
| $CCl_2FCCIF_2$ | | 151.19 | 160.52 | | | | | 160.52 | 160.52 | | | 16.05 | 3.36 | 12.69 | 9.33 | 3.36 | | 151.19 | |
| $CHCl_2CCIF_2$ | | 3.87 | 3.87 | | | | | 3.87 | 3.87 | | | 0.38 | 0.38 | | | | | 3.87 | |
| $CHCl_2CHCIF$ | | 3.87 | 3.87 | | | | | 3.87 | 3.87 | | | 0.39 | | 0.39 | | | 0.39 | 3.87 | |
| $CHCl_2CH_2CI$ | | 4.84 | 4.84 | | | | | 4.84 | 4.84 | | | 0.48 | | 0.48 | | | 0.48 | 4.36 | |
| Heavy products | | | | | | | | | | | | | | | | | | | 0.80 |
| HF | | | | 190.00 | 371.56 | 561.56 | 373.00 | | | | | | | | | | | | |
| $H_2$ | | | | | | | | | | | | | | | | | | | |
| Light products | | | 2.33 | | | | | 2.33 | | | 2.33 | | | | | | | | |
| Total | 93.28 | 554.90 | 1,116.90 | 190.00 | 371.56 | 561.56 | 373.00 | 648.18 | 564.23 | 78.51 | 5.44 | 56.41 | 10.04 | 46.37 | 10.26 | 34.86 | 1.25 | 553.49 | 0.80 |

The above-described embodiment illustrates the efficient operation of the invention with separation of the hydrogen which is vented via conduit 46 and recovery of partially fluorinated products via conduits 70 and 82 for recycle via conduit 58.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. In a process for the fluorination of a fluorinatable organic compound feedstock wherein, an electric current is passed through a current-conducting, essentially anhydrous, liquid hydrogen fluoride electrolyte contained in an electrolysis cell provided with a cathode and an anode, a feedstock is passed into said cell and into contact with said anode and at least partially fluorinated, and fluorinated product is recovered from an effluent stream withdrawn from said cell, the improvement comprising: passing said effluent stream to a cooling zone and therein cooling said effluent stream to a temperature sufficient to condense therefrom hydrogen fluoride and higher boiling materials higher boiling than hydrogen fluoride which are contained in said effluent stream; passing said cooled effluent stream to a first separation zone and therein effecting a separation between condensed hydrogen fluoride and other condensed effluent components including fluorinated products and any unreacted feedstock; passing the non-condensed portion of said cooled effluent stream from said first separation zone to an absorption zone and therein contacting same with an absorbent selected from the group consisting of (a) said feedstock, (b) a high boiling by-product fraction produced in said fluorination step, and (c) mixtures of said (a) and said (b); and recovering fluorinated products from the resulting rich absorbent and said other condensed effluent components.

2. A process according to claim 1 wherein: said fluorinated products are recovered by combining said rich absorbent from said absorption zone with said other condensed effluent components from said first separation zone; passing said combined stream to a second separation zone and therein separating a first stream comprising said absorbent and unreacted feedstock from said condensed effluent, and a second stream comprising fluorinated products; and recycling at least a portion of said first stream to said electrolysis cell as at least a portion of said feedstock thereto.

3. A process according to claim 1 wherein said absorbent is a stream of said feedstock which is introduced into said absorption zone.

4. A process according to claim 1 wherein said absorbent is a stream of said high boiling by-product fraction.

5. A process according to claim 1 wherein said absorbent is a mixture of said feedstock and said high boiling by-product fraction.

6. A process according to claim 2 wherein said feedstock is ethylene dichloride, and said fluorinated product comprises 1,2-dichlorotetrafluoroethane and is recovered from said second stream separated in said second separation zone.

7. A process according to claim 6 wherein at least the major portion of said feedstock is introduced directly into said absorption zone as said absorbent.

8. A process according to claim 2 wherein a portion of said first stream comprising absorbent and unreacted feedstock is passed into a third separation zone and therein a separation is effected to recover a stream comprising unreacted feedstock which is passed to said electrolysis cell and another stream comprising said high boiling by-product fraction.

9. A process according to claim 8 wherein said feedstock is ethylene dichloride, said fluorinated product comprises 1,2-dichlorotetrafluoroethane and is recovered from said second stream separated in said second separation zone, and another stream comprising 1,1,2-trichlorotrifluoroethane is recovered from said third separation zone as another product of the process.

10. A process according to claim 1 wherein: said feedstock is ethylene dichloride; at least the major portion of said feedstock is introduced into said absorption zone as said absorbent; rich absorbent from said absorption zone is combined with said other condensed effluent components from said first separation zone; the resulting combined stream is passed to a second separation zone and therein separated into a first stream comprising ethylene dichloride and partially fluorinated products, another stream consisting essentially of 1,2-dichlorotetrafluoroethane as one product of the process, and another stream consisting essentially of chloropentafluoroethane as another product of the process; and at least a portion of said first stream is recycled to said electrolysis cell as at least a portion of said feedstock thereto.

11. A process according to claim 10 wherein: another portion of said first stream is passed to a third separation zone and therein separated into a stream comprising 1,2-dichloro-1,2,2-trifluoroethane which is recycled to said electrolysis cell, a stream comprising ethylene dichloride which is recycled to said electrolysis cell, a stream comprising 1,1,2-trichloro-1,2,2-trifluoroethane which is recovered as another product of the process, and a stream comprising a fluorinated high boiling by-product fraction.

12. A process according to claim 1 wherein said cooling zone is operated at a temperature within the range of from $-100$ to $50°$ C. and a pressure within the range of from 0 to 200 p.s.i.g.

13. A process according to claim 6 wherein said cooling zone is operated at a temperature within the range of from $-100$ to $50°$ C. and a pressure within the range of from 0 to 200 p.s.i.g.

References Cited

UNITED STATES PATENTS

| | | | |
|---|---|---|---|
| 2,519,983 | 8/1950 | Simons | 204—59 |
| 3,511,761 | 5/1970 | Childs et al. | |

JOHN H. MACK, Primary Examiner

N. A. KAPLAN, Assistant Examiner